3,000,964
PROCESS OF RECOVERING BORON FLUORIDE CATALYST FOR THE ALKYLATION OF PHENOLS

John G. Milligan, Austin, Tex., assignor to Jefferson Chemical Company, Inc., New York, N.Y., a corporation of Delaware
No Drawing. Filed Apr. 8, 1953, Ser. No. 347,607
2 Claims. (Cl. 260—624)

This invention relates to the recovery of boron fluoride employed as catalyst in the alkylation of phenols.

Alkylated phenols having an alkyl radical containing 3 or more carbon atoms are useful as intermediates in the synthesis of detergents, oil addition agents, in the compounding of natural and synthetic rubbers and in the production of modified phenolic resins. They are commonly produced by condensing phenol with an olefin of the desired chain length in the presence of boron fluoride as the catalyst. While a relatively small amount of catalyst per unit weight of phenol alkylated may be employed, the catalyst is expensive, and, hence, its recovery in a reusable form is important from an economic standpoint. Notwithstanding this fact, to the best of my knowledge and belief, no satisfactory method for recovering the boron fluoride catalyst in a reusable form has been developed prior to this invention.

It is an object of this invention to provide a process for the recovery of the boron fluoride catalyst employed in the alkylation of phenols which process results in the recovery of the catalyst with little or no loss and in a reusable form.

Other objects and advantages of this invention will be apparent from the following detailed description thereof.

In accordance with this invention an inert entrainer for the boron fluoride catalyst is added to the reaction mixture and when the alkylation reaction is complete, the resultant mixture is distilled under conditions such that the entrainer vapors carry the catalyst into a condenser where the entrainer is condensed but the catalyst remains in the gaseous phase. The condensed entrainer is returned to the boiling mixture. The boron fluoride catalyst, as it evolves, is passed from the condenser in the vapor phase into a body of phenol maintained in the liquid phase desirably at a temperature of from 40° to 100° C., preferably about 45° C.; the phenol absorbs the boron fluoride. The resulting boron fluoride phenol mixture may be used for alkylation as a source of both boron fluoride and phenol.

Removal of catalyst may also be carried out in a continuous manner by adding the reaction mixture and the entrainer, either separately or together, to a fractionating column where the boron fluoride and entrainer escape from the top of the column and the catalyst-free alkyl phenol is recovered from the bottom.

Desirably, distillation of the reaction mixture containing entrainer is continued until the reaction mixture no longer contains catalyst. The alkylated phenol may then be distilled off to obtain the desired product free of catalyst.

As the phenol subjected to alkylation, phenol, a polyhydroxy phenol or a substituted phenol containing an alkyl, aryl, alkaryl or aralkyl group may be employed. Preferred alkyl phenols which may be further alkylated are those containing from 1 to 20 carbon atoms in the alkyl group. The term phenols is used herein to designate generally compounds which contain one or more hydroxyl groups directly attached to an aromatic nucleus.

As the alkylating agent, olefins are preferably used; the chain length and structure of the olefins are not critical. In general, an olefin having at least 3 carbon atoms, preferably from 4 to 20 carbon atoms is employed.

In carrying out the reaction, it is preferred to dissolve the catalyst in the phenol in the liquid phase, while agitating, and then add somewhat less than an equimolar amount of olefin at such a rate that the temperature of the reaction mixture does not exceed 100° C. When all of the olefin is added, agitation may be continued for an additional short time to insure completion of the reaction, which desirably is carried out at a temperature of from 40° to 120° C. An excess of phenol over and above the stoichiometric amount which reacts with the olefin is desirably used; when this is done substantially all of the olefin reacts with the phenol. When employing a relatively low boiling olefin, e.g., boiling below about 60° C., it is preferable to carry out the reaction in a closed vessel so that any desired reaction temperature may be used without loss of olefin or catalyst by vaporization. Utilizing higher boiling olefins, the reaction may be carried out under atmospheric pressure. In all cases it is highly desirable to prevent access of atmospheric or other moisture to the reactants in order to avoid corrosion and maintain catalyst activity.

The preferred catalyst is boron trifluoride in the form of the phenol complex. The amount of catalyst used in general should be from 1% to 10% by weight, preferably from 2% to 6% by weight based on the weight of the phenol.

The entrainer should be chemically inert to the catalyst, to the reactants and to the reaction products and should cause the reaction mixture to boil at a temperature within the range of from 50° to 175° C., preferably from 100° to 175° C., at atmospheric pressure. Paraffinic (including cycloparaffinic) hydrocarbons and aromatic hydrocarbons in which the boron trifluoride is sparingly soluble; which hydrocarbons are inert to the phenol, olefin and alkylated phenol under the conditions of reaction and which boil within the range of 30° to 200° C., preferably 50° to 130° C., may be used. Preferably, the entrainer used has a boiling point well below that of the phenol. Examples of suitable entrainers are pentane, hexane, heptane, octane, nonane, cyclohexane, the paraffinic hydrocarbon fractions sold under the trade name Skellysolve, cuts of hydrogenated propylene polymer boiling within the range of 50° to 130° C., inert hydrocarbons associated with propylene polymer which inert hydrocarbons boil within the range of 50° to 130° C., benzene and toluene. Boron fluoride is sparingly soluble in these entrainers; thus, in the case of propylene polymer at atmospheric pressure and 25° C., 0.3 gram of boron fluoride dissolve in 100 grams of propylene polymer and at 100° C., 0.1 gram of boron fluoride dissolves in 100 grams of propylene polymer.

The amount of entrainer added to the reaction mixture or to the fractionating column in which the reaction mixture is refluxed is not critical provided enough entrainer is utilized to effect the complete removal of the catalyst from the reaction mixture; in general, from 30% to 200% by weight of the entrainer based on the weight of the reaction mixture may be used. The entrainer may be added at any desired stage of the process. Thus, it may be added along with the olefin employed as the alkylating agent, it may be separately added before or when the alkylation reaction is complete, or the reaction mixture may be introduced into a fractionating column in which the entrainer is refluxing.

The removal of the catalyst may be carried out under atmospheric, sub or superatmospheric pressure conditions. The temperature employed will depend on the particular reactants and entrainers used and on the pressure used. Operating at atmospheric pressure the temperature will be within the range of 100° to 175° C. when entrainers such as nonane, octane and benzene are used. Under subatmospheric pressure conditions the temperatures will be correspondingly lower and under superatmospheric pressure conditions the temperatures will be correspondingly higher.

The following examples illustrate the invention but are not to be regarded as limiting it in any way.

EXAMPLE I 126 grams (1.0 mol) of $C_9$ olefin (propylene trimer) of boiling range 140°–158° C. are added to a solution of 6.8 grams (0.1 mol) of boron trifluoride in 188 grams (2.0 mols) of phenol at 40° C. The temperature rises to 105° C. as the reaction is exothermic. The reaction mixture is added to the top of a fractionating column in which heptane is refluxing. The boron trifluoride catalyst passes out through the reflux condenser and is absorbed in a body of phenol at 45° C.

When all of the boron trifluoride is removed, the liquid in the still pot is subjected to distillation to drive off the heptane. After removal of the heptane there are obtained 188.5 grams of mononoyl phenol and 17.5 grams of dinonyl phenol. The recovery of the boron fluoride catalyst is substantially complete.

EXAMPLE II 302 grams of a higher olefin fraction from polymer gasoline (boiling range 120°–140° C. at 1.5 mm. and bromine number 53) are added to a phenol solution of 3.4 grams (0.05 mol) of boron trifluoride in 141 grams (1.5 mols) of phenol. The mixture is heated to 105° C. for 1½ hours. 100 ml. of benzene is added and the resultant mixture refluxed in a packed fractionating column. The evolved boron trifluoride escapes from the reflux condenser connected with the fractionating column and passes into a body of 141 grams of phenol at 45° C. A residue of alkyl phenol weighing 146 grams is left in the still after distilling off the benzene.

The recovery of the boron trifluoride catalyst is substantially complete.

Equally good separation of the boron fluoride catalyst is obtained by the use of the other entrainers mentioned above. Thus, for example, the introduction of Skellysolve E (a paraffinic hydrocarbon fraction which has a boiling range of from about 100° to about 140° C.) into the fractionating column in which the alkyl phenol reaction mixture is distilled, in accordance with this invention, results in the complete recovery of the boron fluoride absorbed in the body of phenol, which phenol-boron fluoride mixture may be used for alkylation as a source of both boron fluoride and phenol.

From the above it will be noted that the process of this invention results in the recovery of the boron fluoride catalyst employed in the alkylation of phenols with little or no loss of the catalyst and in a reusable form. Furthermore, notwithstanding the recovery is effected by refluxing the reaction mixture in the presence of the added entrainer, little or no loss of the desired alkylated phenol takes place. This is indeed surprising since it is generally recognized that the subjection of the reaction mixture to elevated temperatures results in side reactions with consequent reduction in yield of the desired alkylated phenol.

It is to be understood that this invention is not restricted to the present disclosure, otherwise than as defined by the appended claims.

What is claimed is:

1. In the alkylation of phenol with propylene polymer in the presence of a catalyst consisting essentially of $BF_3$, the method of recovering $BF_3$ from the alkylation reaction mixture which comprises adding 30% to 200% by weight based on the reaction mixture of a liquid entrainer, boiling within the range 30 to 200° C. selected from the group consisting of pentane, hexane, heptane, octane, nonane, cyclohexane, hydrogenated propylene polymer boiling within the range of 50° to 130° C., inert hydrocarbons associated with propylene polymer boiling within the range 50° to 130° C., benzene and toluene, effective to result in boiling of the reaction mixture plus entrainer at a temperature within the range of 50 to 175° C., refluxing the reaction mixture within said temperature range to evolve as vapor a mixture of the $BF_3$ and entrainer while subjecting said vapor mixture to cooling to condense the entrainer while leaving the $BF_3$ in the vapor state, returning the condensed entrainer to the refluxing mixture, removing the $BF_3$ as vapor from the condensation zone, continuing the refluxing until substantially all of the $BF_3$ has been removed, and absorbing the $BF_3$ vapor in liquid phenol for reuse in the process.

2. A process according to claim 1 in which said entrainer is heptane.

References Cited in the file of this patent

UNITED STATES PATENTS

| | | |
|---|---|---|
| 2,521,444 | Brooke et al. | Sept. 5, 1950 |
| 2,564,073 | Lien et al. | Aug. 14, 1951 |
| 2,644,017 | McCauley et al. | June 30, 1953 |
| 2,655,544 | McNulty et al. | Oct. 13, 1953 |